United States Patent
Rosenholm et al.

(10) Patent No.: US 9,273,724 B1
(45) Date of Patent: Mar. 1, 2016

(54) THRUST BEARING PAD HAVING METALLIC SUBSTRATE

(71) Applicant: Bruce Diamond Corporation, Attleboro, MA (US)

(72) Inventors: C. Andrew Rosenholm, Barrington, RI (US); Scott O'Brien, Concord, NH (US); Amitava Datta, East Greenwich, RI (US)

(73) Assignee: Bruce Diamond Corporation, Attleboro, MA (US)

( * ) Notice: Subject to any disclaimer, the term of this patent is extended or adjusted under 35 U.S.C. 154(b) by 0 days.

(21) Appl. No.: 14/102,657

(22) Filed: Dec. 11, 2013

Related U.S. Application Data (60) Provisional application No. 61/735,767, filed on Dec. 11, 2012.

(51) Int. Cl.
  *F16C 33/06* (2006.01)
  *F16C 17/04* (2006.01)
  *F16C 33/04* (2006.01)
  *F16C 17/03* (2006.01)

(52) U.S. Cl.
  CPC ............ *F16C 33/043* (2013.01); *F16C 17/035* (2013.01); *F16C 17/045* (2013.01); *F16C 2206/40* (2013.01); *F16C 2206/80* (2013.01); *F16C 2223/30* (2013.01); *F16C 2226/34* (2013.01)

(58) Field of Classification Search
  CPC ........ F16C 17/035; F16C 17/04; F16C 33/06; F16C 33/046; F16C 2206/40; F16C 2206/80; F16C 2223/30; F16C 2226/34; C23C 30/00
  USPC ............. 384/105, 420, 425, 625, 907.1, 912; 175/426, 434, 435; 428/357
  See application file for complete search history.

(56) References Cited

U.S. PATENT DOCUMENTS

| | | | | |
|---|---|---|---|---|
| 3,445,909 | A * | 5/1969 | Beebe, Jr. .................. | 29/898.12 |
| 3,594,527 | A * | 7/1971 | Brant .......................... | 200/11 G |
| 5,637,353 | A * | 6/1997 | Kimock ................... | 427/255.34 |
| 5,820,271 | A * | 10/1998 | Hackett, Jr. ................... | 384/425 |
| 6,012,900 | A * | 1/2000 | Kennedy et al. ........... | 415/199.2 |
| 6,528,123 | B1 * | 3/2003 | Cadden et al. ................ | 427/404 |

(Continued)

FOREIGN PATENT DOCUMENTS

| EP | 2341162 A1 * | 7/2011 | ............... F16C 33/20 |
|---|---|---|---|
| GB | 2044865 A * | 10/1980 | ............... F16D 13/50 |
| JP | 2004183699 A * | 7/2004 | ................ F16K 3/02 |

OTHER PUBLICATIONS

Craig Cooley and Tim Seton, US Synthetic Bearings and Ken Bertagnolli, US Synthetic, "Using Synthetic Diamond to Improve Machine Performance," www.pump-zone.com/topics/bearings/using-synthetic-diamond-improve-machine-performance, website visited Dec. 3, 2013, pp. 1-6, USA.

*Primary Examiner* — Marcus Charles
(74) *Attorney, Agent, or Firm* — Dingman, McInnes & McLane, LLP (57) ABSTRACT

A thrust bearing pad includes a relatively low wear and low friction contact layer disposed on a metallic substrate. The metallic substrate allows a manufacturer to couple the thrust bearing pad to a corresponding metallic thrust bearing in a relatively secure manner while the contact layer extends the operating life of the thrust bearing and minimizes maintenance.

10 Claims, 6 Drawing Sheets

(56) References Cited

U.S. PATENT DOCUMENTS

| | | | |
|---|---|---|---|
| 7,163,368 B2 * | 1/2007 | Ide et al. | 384/907 |
| 7,493,973 B2 * | 2/2009 | Keshavan et al. | 175/434 |
| 8,074,748 B1 * | 12/2011 | Miess et al. | 175/374 |
| 8,689,912 B2 * | 4/2014 | Belnap et al. | 175/434 |
| 2012/0148940 A1 * | 6/2012 | Kuehn et al. | 429/508 |

\* cited by examiner

THRUST BEARING PAD HAVING METALLIC SUBSTRATE

RELATED APPLICATIONS

This patent application claims the benefit of U.S. Provisional Application No. 61/735,767, filed on Dec. 11, 2012, entitled, "Thrust Bearing pad Having Metallic Substrate," the contents and teachings of which are hereby incorporated by reference in their entirety.

BACKGROUND

Figure 1A:
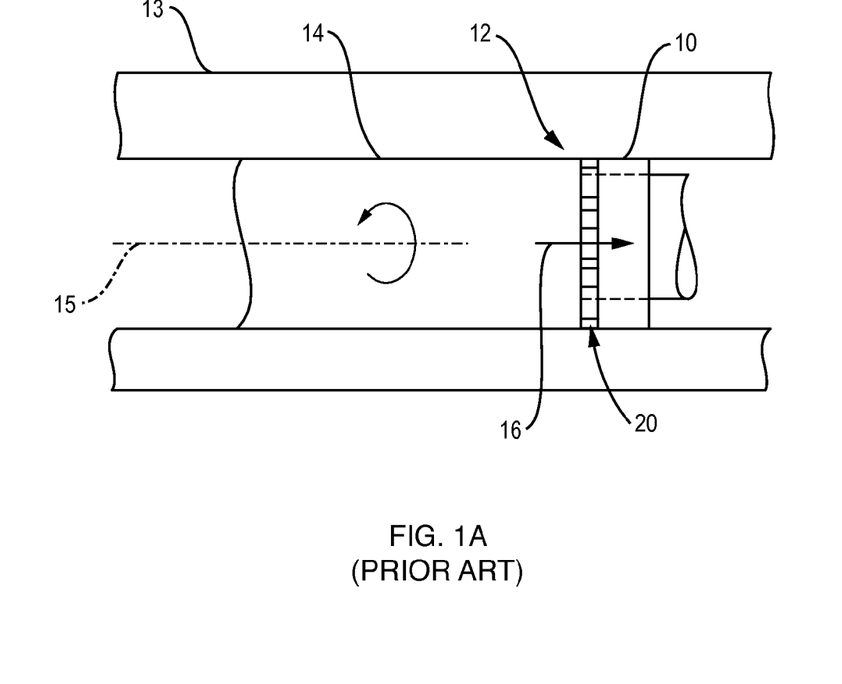
FIG. 1A illustrates a schematic representation of a prior art shaft having a thrust bearing.

In conventional drilling systems, such as indicated in FIG. 1A, a thrust bearing 10 is installed at the end face 12 of a rotating shaft 14 to substantially maintain the shaft in a given position within a housing 13 and relative to a longitudinal axis 15 of the drilling system. For example, the thrust bearing 10 opposes an axial load 16 generated by the shaft 14 during operation to maintain the longitudinal positioning of the shaft. The axial or thrust load 16 can be relatively high for mud pumps, such as used in drilling for the oil and gas industry, and for other rotating equipment, such as large gas and steam turbines as well as blowers, for example.

SUMMARY

Figure 1B:
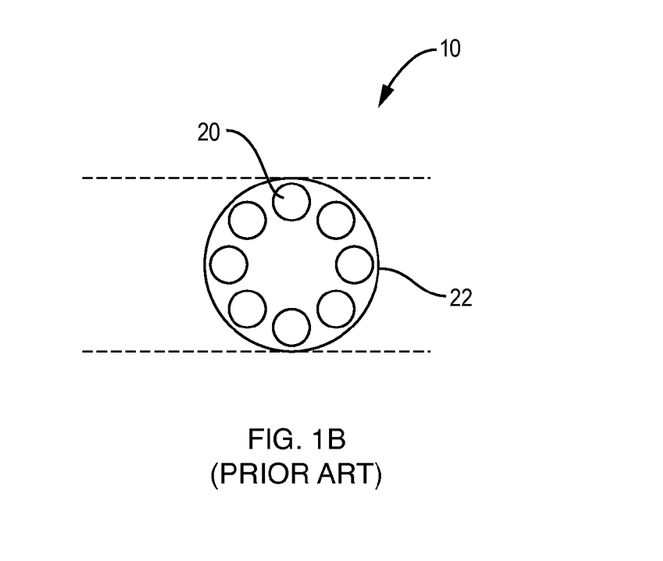
FIG. 1B illustrates a schematic representation of a prior art set of thrust pads of the thrust bearing of FIG. 1A.

As the face of the shaft 14 rotates against the thrust bearing 10, a typical thrust bearing 10 includes a set of thrust pads 20 mounted to a disk 22, as illustrated in FIG. 1B. Certain conventional thrust pads 20 are manufactured from a special polymeric or metallic material, such as polyether ether ketone (PEEK) or bronze. However, during operation under extreme loading conditions, such as under millions of pounds of axial load, the thrust pads 20 can wear away from the disk 22 relatively quickly, thereby limiting the operating life of the thrust bearing 10 and requiring frequent maintenance. Other conventional thrust pads 20 are manufactured from polycrystalline diamond material and are typically utilized in extreme loading applications. However, polycrystalline diamond thrust pads are relatively expensive and impractical for conventional applications.

By contrast to conventional thrust pads, embodiments of the present innovation relate to a thrust bearing pad having a relatively low wear and low friction contact layer disposed on a metallic substrate. The metallic substrate allows a manufacturer to couple the thrust bearing pad to a corresponding metallic thrust bearing in a relatively secure manner while the contact layer extends the operating life of the thrust bearing and minimizes maintenance.

In one arrangement, the contact layer is manufactured from a ceramic pad that is brazed to a metallic substrate. In one arrangement, the contact layer is configured as a monolithic ceramic material brazed to the metallic substrate. In one arrangement, the contact layer is configured as a cermet material applied to the metallic substrate. In one arrangement, the contact layer is configured as a relatively hard metallic layer. The ceramic, cermet, or relatively hard metallic layers can each include a hard diamond-like carbon (DLC) type coating disposed thereon. In one arrangement, the contact layer is a plastic material having an interlocking structure, such as a dovetail channel, configured to mate with a corresponding interlocking structure of the metallic substrate.

The resulting thrust bearing pads are cost effective yet provide high performance relative to conventional thrust pads. In addition to low wear characteristics, the thrust bearing pads are configured with a relatively low coefficient of friction. Accordingly, during operation when running against a rotating, metallic shaft, the thrust bearing pads can reduce heat generation to minimize damage to the shaft and thrust bearing.

In one arrangement, a thrust bearing pad includes a metallic substrate configured to be coupled to a carrier element and a ceramic pad brazed to the metallic substrate.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Figure 2A:
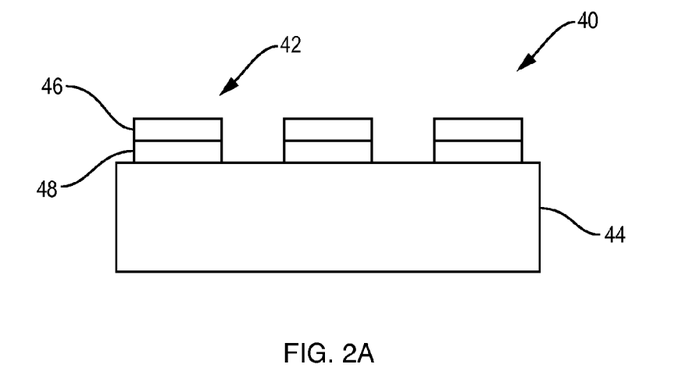
FIG. 2A illustrates a side view of a schematic representation of a thrust bearing having a set of thrust bearing pads, according to one arrangement.

FIG. 2A illustrates a schematic representation of a thrust bearing 40 having a set of thrust bearing pads 42 disposed on a carrier element or carrier disc 44, according to one arrangement. Each thrust bearing pad 42 includes a contact layer 46 configured to contact a rotating shaft and a metallic substrate 48 configured to secure the thrust bearing pad 42 to the carrier disc 44. While the metallic substrate 48 can be manufactured from a variety of materials, in one arrangement, the metallic substrate 48 is manufactured from a corrosion resistant material, such as stainless steel materials. While the thrust bearing pads 42 can be secured to the carrier disc 44 in a variety of ways, in one arrangement, the metallic substrates 48 of the thrust bearing pads 42 are bolted to the carrier disc 44. Alternately, the metallic substrates 48 of thrust bearing pads 42 can be secured to the carrier disc 44 to allow tilting of the pads 42 in the direction of rotation during operation.

As indicated above, the contact layer 46 is disposed on the metallic substrate 48 and is manufactured from a relatively low wear and low friction material. As described below, the contact layer 46, metallic substrate 48, and resulting thrust bearing pad 42 can be configured in a variety of ways.

Figure 2B:
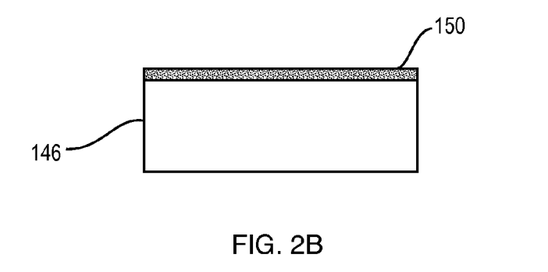
FIG. 2B illustrates a side view of a contact layer of a thrust bearing pad having a monolithic ceramic layer and a DLC coating layer, according to one arrangement.

In one arrangement, with reference to FIGS. 2B through 3C, the thrust bearing pad 142 is configured as a ceramic disc or pad 146 brazed to a metal substrate 148. For example, the ceramic pad 146, as illustrated in FIG. 2B, can be a monolithic ceramic material, such as silicon carbide (e.g., both sintered and reaction bonded or a composite of silicon carbide and other ceramics such as aluminum oxide), silicon nitride (e.g., both sintered and reaction bonded or a composite of silicon nitride and other ceramics such as aluminum oxide), aluminum oxide mixed with zirconium oxide, or transformation toughened zirconium oxide. Additionally, the ceramic pad 146 can be manufactured from other monolithic carbides, nitrides, and oxide ceramics having superior low friction and low wear characteristics relative to conventional pads. For example, a coefficient of friction in the range of between about 0.1 and 0.3 is considered low. Conventionally, the coefficient of friction of plastic to metal is within this range. However, the corresponding wear rate of plastic to metal is high. Typically, plastic thrust bearing pads utilized in a mud pump wear off within 8 and 24 hrs of operation. By contrast, interaction between the ceramic layer 146 and a metallic rotating shaft simultaneously provides a relatively low coefficient of friction (e.g., between about 0.1 and 0.3) and a relatively low wear rate.

In one arrangement, to further enhance the relatively low wear and low friction characteristics of the ceramic pad 146, these monolithic ceramics can be coated with a diamond like carbon (DLC) coating 150, such as on a bearing or contact surface of the ceramic pad 146. Typically, DLC coatings are formed of a carbon material having an amorphous, non-crystalline carbon structure, such as produced through a chemical vapor deposition or sputter deposition process using a graphite target. DLC coatings have relatively high hardness values, in a range of about 3400 and about 4800 Knoop hardness (HK). Additionally, DLC coatings have relatively low coefficient of friction values, in a range of about 0.09 to about 0.15 running against hard metallic surfaces, such as a high strength steel rotor.

In one arrangement, the DLC coating 150 is applied using a Physical Vapor Deposition (PVD) or sputtering process which improves the effectiveness of the DLC coating 150. If DLC is applied directly on the metallic substrate 148, which can deform under a relatively high contact load, the thin hard and brittle DLC coating layer 150 will also deform with the metallic substrate 148 and can fracture. Such fracture can create fragments that become lodged between the thrust bearing and the end face of the rotating shaft, thereby resulting in three body wear of the shaft and cause serious damage. Accordingly, application of the DLC coating 150 over the ceramic pad 146 minimizes such cracking and generation of fragments.

As indicated in FIGS. 3A through 3D, the ceramic layer 146 is secured to the metal substrate 148. Monolithic ceramic materials have a relatively lower coefficient of thermal expansion compared to that of the corresponding metallic substrates. For example, thermal expansion coefficients for ceramic materials are between about $3\times10^{-6}$ and $5\times10^{-6}$ per ° C. whereas thermal expansion coefficients for metallic alloys are between about $10\times10^{-6}$ and $15\times10^{-6}$ per ° C. In one arrangement, to account for the difference in thermal expansion coefficients, to provide a relatively high joint strength, and to limit or prevent cracking of the relatively brittle ceramic layer 146, a manufacturer brazes the ceramic layer 146 to the metal substrate 148. A variety of brazing processes can be used to attach the ceramic layer or pad 146 to the metallic substrate 148, as will be described in detail below.

Figure 3A:
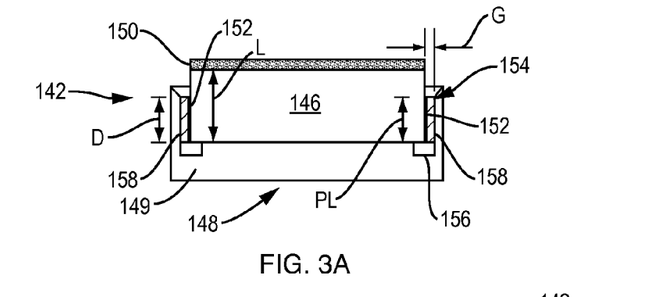
FIG. 3A illustrates a brazed joint configuration between a monolithic ceramic layer and a metallic base configured as a metallic cup, according to one arrangement.

One brazing process, such as illustrated in FIG. 3A, couples a circumferential surface of the ceramic disc or pad 146 disposed within a metallic base or cup 149. During the brazing process, a circumferential surface of the ceramic pad 146 is first metalized 152. Conventional metalization processes use a Mo—Mn slurry, which is applied on the ceramic part and fired in a reducing atmosphere. The process forms a Mo—Mn layer chemically bonded to ceramics. As an alternate to the conventional Mo—Mn process, a manufacturer can apply a relatively thin nickel-base, copper-silver base, silver-base and/or similar braze alloy paste with active metals such as titanium around the circumference of the ceramic pad 146 and run the ceramic pad 146 through a braze cycle. The braze paste reacts with the ceramic pad 146 and forms a thin metalized braze alloy layer 152 chemically bonded to the ceramic pad 146. Because the metallic braze alloy layer 152 is relatively thin, it does not cause damage to the ceramic face during cooling, which stems from stresses generated by a thermal expansion coefficient mismatch between the braze alloy layer 152 and the pad 146.

Following the metallization process, the metalized braze alloy layer 152 of the ceramic pad 146 is brazed directly to the metallic base 149. In one arrangement, the first metalizing braze alloy 152 should have a higher brazing temperature compared to the second braze alloy 158 used for joining the metalized ceramic pad 146 and the metallic base 149. For example, a SiC ceramic pad 146 can be metalized with a nickel base brazing alloy, such as BNi-2, at a brazing temperature of about 1000° C. The metallization process is followed by brazing the braze alloy layer 152 of the SiC ceramic pad 146 to an inner surface of the metallic cup 149 with a soft Ag—Cu braze alloy 158 at a brazing temperature of about 850° C. The two step brazing process is known as step brazing.

In one arrangement, a radial clearance or joint gap (G) between the ceramic pad 146 and the inner surface the metallic cup 149 is between about 0.0005 inches and 0.01 inches and can be more specifically between about 0.001 inches and 0.004 inches. For example, the radial clearance G is configured as the total thickness of a braze joint 158, such as a Ag—Cu braze joint, disposed within the annular space between the outer diameter of the braze alloy layer 152 and the inner diameter of the metallic cup 149. The size of the radial clearance G is selected based upon the physical properties of the ceramic pad 146, the braze joint 158, and the metalized layer or braze alloy layer 152. A relatively larger radial clearance G can cause the ceramic pad 146 to crack because of a relatively high compressive stress generated by a thicker circumferential braze alloy ring. By contrast, a relatively smaller gap is difficult to maintain.

In one arrangement, a rim of the metallic cup 149 is beveled to hold additional braze paste to fill the larger gap created by higher thermal expansion of the metallic cup 149 at the brazing temperature. If the joint between the ceramic pad 146 and an inner diameter the metallic cup 149 is too thick, the annular braze joint 158 can impart enough compressive force during solidification of the braze alloy to crack the ceramic pad 146 even if the braze alloy is relatively soft, such as Ag—Cu.

In one arrangement, the area of metallization 152 is also important. For example, the metalized area 152 extends substantially up to the cup rim 154 of the metallic cup 149 to minimize spreading of the braze alloy could spread beyond the joint (i.e., beyond the cup rim 154) and to maintain the strength of the bond between the ceramic pad 146 and the metallic cup 149 at the cup rim 154. By contrast, if the braze alloy layer 152 were to extend beyond the partial length PL, such as along a length L of the ceramic pad 146, during the brazing process, the braze alloy could spread beyond the joint between the ceramic pad 146 and the metallic cup 149, leaving the joint porous and weak.

In one arrangement, the metallic cup 149 defines a clearance 156 at the bottom corner relative to the ceramic pad 146. For example, the clearance 156 extends about an inner periphery of the metallic cup 149. The clearance 156 is configured to minimize or limit any contact between the ceramic pad corners and the metallic cup 149 to limit or eliminate localized stress raisers at the ceramic pad corners. This joint design is configured to impart compressive stress on the ceramic pad 146 which is beneficial as ceramics typically cannot withstand tensile stresses.

Figure 3B:
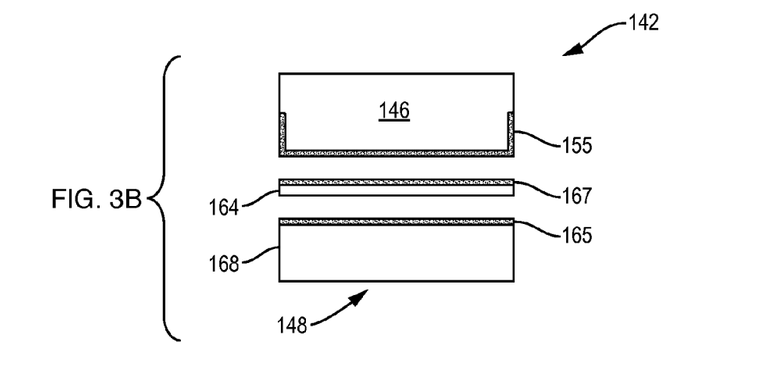
FIG. 3B illustrates an exploded view of a brazed joint configuration between a monolithic ceramic layer and a metallic base using a substantially continuous butt joint with a soft metal interlayer, according to one arrangement.
Figure 3C:
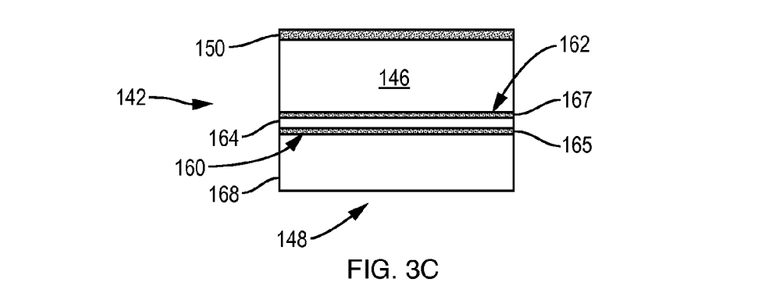
FIG. 3C illustrates an assembled brazed joint configuration between a monolithic ceramic layer and a metallic base using a substantially continuous butt joint with a soft metal interlayer, according to one arrangement.

In another brazing process, as illustrated in FIGS. 3B and 3C, a manufacturer forms a butt joint 160 with a substantially continuous interface between the ceramic pad 146 and the metallic substrate 148. Use of the butt joint 160 maximizes the contact area of the thrust bearing pads 142 and the rotating shaft by eliminating the relatively lager foot print of the metallic cup 148, illustrated in FIG. 3A. During the brazing process, as indicated in FIG. 3B, a brazing interface 162 of the ceramic pad 146 is metalized first. For example, a metallic braze alloy layer 152 is formed about the outer periphery and the base of the ceramic layer 146. A thin foil of a soft metal 164, such as Cu, is then inserted between the base of the ceramic pad 146 and a support surface of a disc-shaped metallic base 168. A first layer of soft braze alloy paste 165, such as Ag—Cu, is applied on the support surface of the metallic base 168, followed by placement of the Cu foil 164 over the first paste layer 165, and placement of a second layer of soft braze alloy paste 167 (e.g., the same braze paste used for the first layer 165) on top of the Cu foil 164. The ceramic pad 146 is then disposed on the paste-coated foil 164. The assembly is brazed with a dead weight to hold all the components together during brazing to create the final thrust bearing pad 142, such as illustrated in FIG. 3C.

Figure 3D:
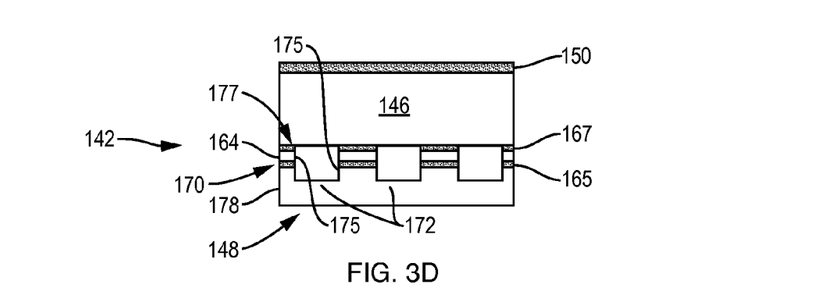
FIG. 3D illustrates a brazed joint configuration between a monolithic ceramic layer and a metallic base using an interrupted butt joint with a soft metal interlayer, according to one arrangement.

In another brazing process, as illustrated in FIG. 3D, a manufacturer forms a butt joint 170 between ceramic pad 146 and the metallic substrate 178 with an interrupted interface prior to brazing the ceramic pad 146 and the metallic substrate 148. For example, the metallic substrate 178 is interrupted by a set of channels 172 disposed between the metallic substrate and the ceramic pad 146. In one arrangement, the metallic substrate 178 is configured with relatively thin vertical fins 175 disposed on either side of each channel 172 and which can minimize joint stress by making the interface more compliant. For example, with the vertical fins 175 configured as relatively thin structures, the vertical fins 175 can bend to accommodate stresses resulting from a thermal coefficient mismatch between the ceramic pad 146 and the metallic substrate 178. The interrupted butt joint generates less stress between the ceramic pad 146 and the metallic substrate 178, such as caused by a mismatch in the thermal expansion coefficients. Additionally, the vertical fins 175 include braze joints 167 disposed substantially at a top surface 177 of each fin 175. Accordingly, the braze joints 167 are separated by the channels 172 thereby making the braze joints 167 discontinuous to reduce stress at the interface between the ceramic pad 146 and the metallic substrate 178.

For the brazing methods described above, in one arrangement, the braze alloy is configured as a relatively soft and ductile material, such as Ag—Cu and/or pure Ag based braze alloys. With such a configuration, following the brazing process and during cooling of the thrust bearing pad 142 from the braze temperature, the relatively soft braze alloy is configured to plastically deform which diffuses stress between the ceramic pad 146 and the metallic substrate 148. In addition, the relatively soft transition layer, such as the Cu foil described with respect to FIGS. 3B and 3D, can undergo plastic deformation during cooling to diffuse stresses generated due thermal expansion mismatch.

In another arrangement, in order to minimize stresses within the ceramic pad 146, multiple layers of materials can be deposited between the ceramic pad 146 and the metallic substrate 148 where the layers provide a gradual change in the thermal expansion coefficient. While the materials can be applied in a variety of way, in one arrangement, a manufacturer utilizes a PVD process to deposit various layers on the ceramic pad. For example, the ceramic pad 146 can be coated with a metallic sputter deposited layer, such as tungsten, having a low thermal expansion coefficient such as between about $4 \times 10^{-6}$ per° C. and $5 \times 10^{-6}$ per° C. This layer, in turn, can be coated with materials having subsequent layers of increasingly higher expansion coefficients, such as materials having a thermal expansion coefficient between about $6 \times 10^{-6}$ per° C. and $18 \times 10^{-6}$ per° C., until the thermal expansion coefficient of the last layer matches the expansion coefficient of the metallic substrate 148.

Figure 4:
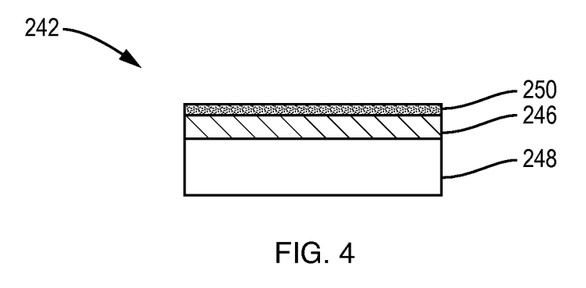
FIG. 4 illustrates a schematic representation illustration of a thrust bearing pad having a cermet layer and a metallic base layer, according to one arrangement.

In one arrangement, with reference to FIG. 4, a thrust bearing pad 242 includes a composite ceramic and metal binder material, or cermet, layer 246 brazed to a metal substrate 248. For example, the cermet layer 246 can be manufactured from WC—Co, WC—Cr—Co, WC—Cr—Ni, Cr2C3—Cr—Ni, Al2O3-binder, Ni and Co base Tribaloys, and other cermets. The cermet layer 246 is configured to increase the fracture toughness of the thrust bearing pad 242, as well as reduce the coefficient of friction associated with the metal substrate 248. For example, fracture toughness of monolithic ceramics is between about 3 and 10 MPa-m$^{-0.5}$ whereas fracture toughness of high strength steels is between about 30 and 90 MPa-m$^{-0.5}$. For cermets, fracture toughness values will be in between these two ranges based on the relative volume fractions of the ceramic and the metallic binder.

The cermet layer 246 can be applied to the metallic substrate 248 using a variety of techniques, such as by thermal spray, sintering of ceramic and metal powder, or by a ceramic/metal injection molding (MIM) process. For example, WC—Cr—Ni cermet can be applied on a metallic substrate 248 by a thermal spray process such as High Velocity Oxy Fuel (HVOF). During application, a mixture of WC and Ni—Cr alloy powder particles are injected into a supersonic oxygen and fuel gas stream. Fuel is ignited to create melted and semi-melted ceramic and metal powder droplets which impinge on the metallic substrate 248 creating a cermet layer

246, as shown in FIG. 4. The cermet layer 246 can also be formed by electro deposition of a metal ceramic composite coating onto the metallic substrate 248. The cermet layer 246 can also be deposited by Ni, Co, Fe base and similar hardfacing alloys. For example, the cermet layer 24 can be applied with a plasma transfer arc process. In another example, the cermet layer 246 can be created by applying a hardfacing alloy powder with an organic binder to the metallic substrate 248 and by heating the coated metallic substrate 248 up to the melting point of the hardfacing alloy.

In one arrangement, the cermet layer 246 includes a DLC coating layer 250 to reduce both the coefficient of friction and wear associated with the cermet layer 246.

In one arrangement, a thrust bearing pad is configured as a relatively hard metallic layer disposed over a metallic substrate (not shown). With such a configuration, the thrust bearing pad has an increased toughness relative to conventional thrust pads to better withstand shock, load, and vibration during operation. The relatively hard metallic layer can be an electroplated hard chrome layer, electroplated Ni, Co and W alloys with ceramic particles, an electro composite layer, or thermal sprayed Co—Mo—Cr and Ni—Mo—Cr Tribaloys. While the relatively hard metallic layer can have a variety of hardness values, in one arrangement, the hard metallic layer can have a hardness range of between about 600 and 1000 Vicker's Hardness Number (VHN). By comparison, high strength steels have a hardness range of between about 400 and 600 VHN. During the application process, thermal spray is utilized to attach Tribaloy to the metallic substrate and an electrolytic process is utilized to attach an electrocomposite (e.g., Ni—Co—P—SiC) to the metallic substrate. In one arrangement, the relatively hard metallic layer has a thickness of between about 0.005 inches and 0.01 inches. In one arrangement, a DLC layer can be applied to the relatively hard metallic layer to reduce both the coefficient of friction and wear associated with the hard metallic layer.

In one arrangement, plastic materials can also be used with a metallic substrate to produce a thrust pad.

Figure 5A:
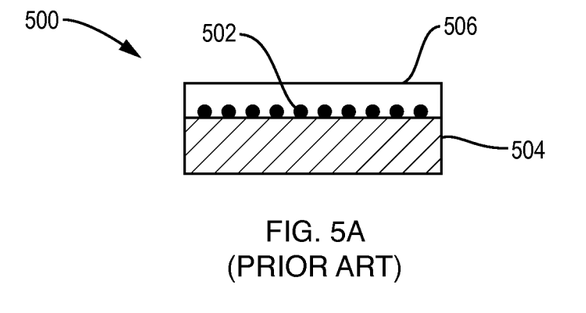
FIG. 5A illustrates a prior art molded plastic pad over a metallic base layer.

With reference to FIG. 5A, a conventional plastic/metal composite thrust pad 500 is shown. During the assembly process, small bronze balls 502 are first brazed to a stainless steel base 504 to produce a rough surface. Various grades of engineered plastics 506 are then molded on the steel base 504 to create a mechanically interlocking structure which provides good mechanical bond between the plastic pad 506 and the metallic base 504. The bronze balls 502 also provide a conductive path of heat transfer to remove frictional heat generated at the thrust pad and rotating shaft end interface. To promote heat transfer, plastics are generally filled with copper powder.

Figure 5B:
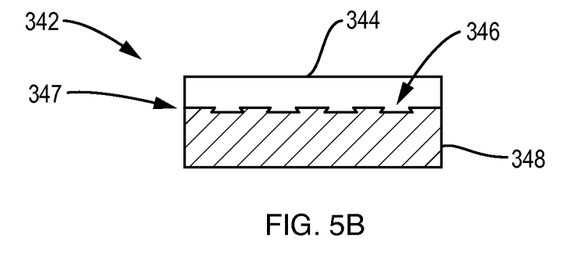
FIG. 5B illustrates a thrust bearing pad having a plastic layer configured with an interlocking structure that mates with a metallic base layer, according to one arrangement.

By contrast, in one arrangement and with reference to FIG. 5B, a thrust bearing pad 342 includes a plastic layer 344 having a first interlocking structure 346, such as a dovetail channel, configured to mate with a corresponding second interlocking structure 347 of the metallic substrate 348. The thrust bearing pad 342 eliminates the brazing step described with respect to FIG. 5A. The thrust bearing pad 342 simultaneously enhances heat transfer by replacing the above-referenced stainless steel base 504 and brazed bronze spheres 502 with a bronze base 348 having machined dovetail cross section channels. The thrust bearing pad 342 is more cost effective, provides superior heat transfer, and provides superior joint strength between the plastic pad 344 and the metallic base 348, relative to the conventional thrust pad 500.

Figure 2C:
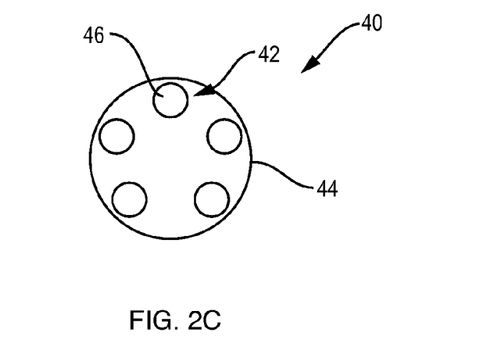
FIG. 2C illustrates a top view of a schematic representation of a thrust bearing having a set of thrust bearing pads, according to one arrangement.

With reference to FIG. 2A, each of the thrust bearing pads 42 can be configured with a variety of shapes to maximize the load bearing area between the thrust bearing 40 and a rotating shaft and to reduce contact pressure on each thrust bearing pad 42. For example, each of the thrust bearing pads 42 can be configured in a generally trapezoidal shape, as illustrated in FIG. 6A, or in a generally circular shape, as illustrated in FIG. 2C.

In one arrangement, to mitigate the relatively high contact pressure found between the thrust bearing pads 42 and a conventional rotating shaft, the thrust bearing pads 42 are configured with a hydrodynamic lift-off mechanism. For example, with continued reference to FIG. 6A, the hydrodynamic lift-off mechanism 600 is defined by the set of thrust bearing pads 42. As illustrated, first and third thrust bearing pads 42-1 and 42-3 define relatively shallow concave surfaces and the second thrust bearing pad 42-2 defines a relatively shallow convex surface. The alternating concave and convex surfaces defines, as the hydrodynamic lift-off mechanism 600, a relatively wavy contact face for the thrust bearing 40. In another example, and with reference to FIG. 6B, the thrust bearing pad 42 defines, as the hydrodynamic lift-off mechanism 600, a relatively shallow radial groove 604.

Figure 6A:
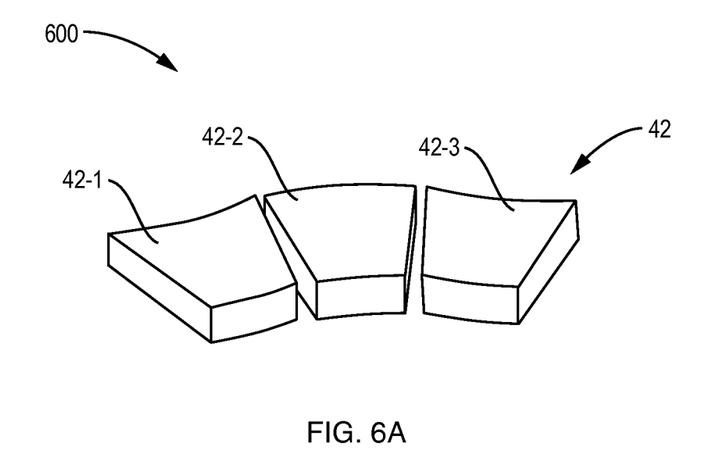
FIG. 6A illustrates a set of thrust bearing pads having alternating shallow concave and convex geometries configured to define a relatively wavy surface, according to one arrangement.
Figure 6B:
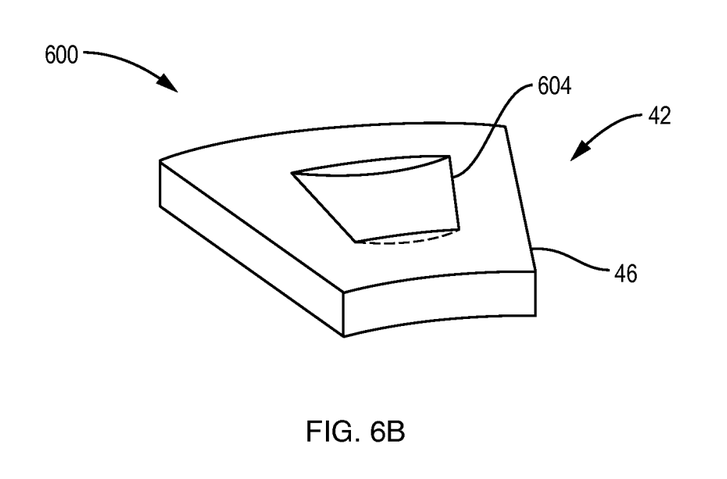
FIG. 6B illustrates a trapezoidal thrust bearing pad defining a relatively shallow radial groove, according to one arrangement.
Figure 7:
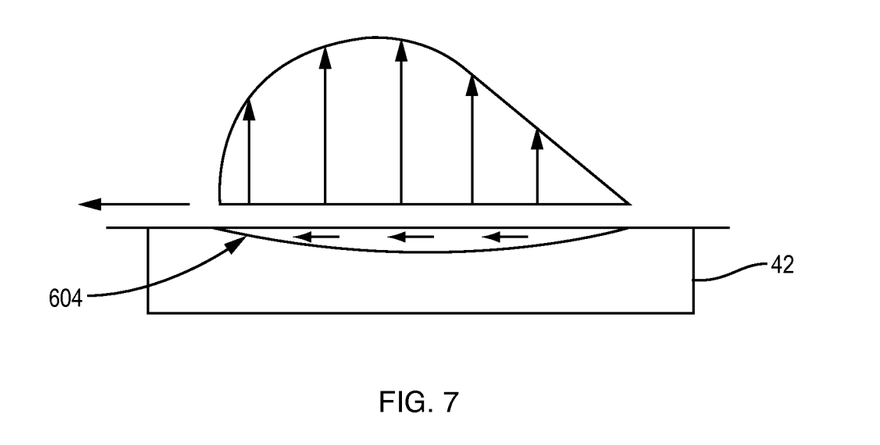
FIG. 7 is a schematic illustration showing hydrodynamic pressure build up in the shallow radial groove of FIG. 6B, according to one arrangement.

During operation, the hydrodynamic lift-off mechanism 600, as shown in either FIG. 6A or 6B, forms a converging wedge of fluid (e.g., bearing oil) between the rubbing surfaces of the thrust bearing (e.g., the bearing surface of the contact layer) and the rotating shaft to decrease the fluid flow cross sectional area and to build up pressure, as shown in FIG. 7, which tries to separate the two rubbing faces. For both the designs in FIG. 6A or 6B, the moving shaft surface drags the viscous fluid into a converging gap between the shaft end face and thrust bearing pad 42 with the shallow groove creating an opening pressure profile. The pressure mitigates contact pressure between the shaft end face and the thrust pad.

While various embodiments of the innovation have been particularly shown and described, it will be understood by those skilled in the art that various changes in form and details may be made therein without departing from the spirit and scope of the innovation as defined by the appended claims.

What is claimed is:

1. A thrust bearing pad, comprising:
   a metallic substrate configured to be coupled to a carrier element; and
   a ceramic pad brazed to the metallic substrate;
   wherein:
      the metallic substrate is configured as a metallic cup;
      the ceramic pad comprises a metalized layer disposed about a circumferential surface of the ceramic pad, the metalized layer brazed to an inner surface of the metallic cup.

2. The thrust bearing pad of claim 1, wherein the ceramic pad comprises a monolithic cermet material.

3. The thrust bearing pad of claim 2, further comprising a diamond-like carbon coating disposed on a bearing face of the ceramic pad.

4. The thrust bearing of claim 1, wherein the ceramic pad comprises a monolithic ceramic material.

5. The thrust bearing pad of claim 1, comprising a braze alloy disposed between the metalized layer of the ceramic pad and the inner wall of the metallic cup, the braze alloy configured to secure the ceramic pad to the metallic cup.

6. The thrust bearing pad of claim 1, wherein the metalized layer of the ceramic pad extends along a longitudinal length, and about a circumference of, the ceramic pad, a length of the metalized layer being substantially equal to a cup depth of the metallic cup.

7. The thrust bearing pad of claim 1, wherein metallic cup defines a clearance relative to an outer diameter of the ceramic pad, the clearance extending about an inner surface of the metallic cup.

8. The thrust bearing pad of claim 7, comprising an annular braze joint disposed within the clearance between the metalized layer of the ceramic pad and the inner surface of the metallic cup.

9. The thrust bearing pad of claim 8, wherein the annular braze joint defines a thickness of between about 0.0005 inches and 0.01 inches.

10. The thrust bearing pad of claim 8, wherein the annular braze joint defines a thickness of between about 0.001 inches and 0.004 inches.

* * * * *